United States Patent [19]

Lassers

[11] Patent Number: 5,343,526

[45] Date of Patent: Aug. 30, 1994

[54] METHOD FOR ESTABLISHING LICENSOR CHANGEABLE LIMITS ON SOFTWARE USAGE

[75] Inventor: Harold A. Lassers, Elmhurst, Ill.

[73] Assignee: AT&T Bell Laboratories, Murray Hill, N.J.

[21] Appl. No.: 968,693

[22] Filed: Oct. 30, 1992

[51] Int. Cl.⁵ .............................................. H04L 9/00
[52] U.S. Cl. ......................................... 380/4; 380/23; 380/25; 380/49
[58] Field of Search ..................... 380/1, 4, 23, 25, 49, 380/50

[56] References Cited

U.S. PATENT DOCUMENTS

| | | | |
|---|---|---|---|
| 4,740,890 | 4/1988 | William | 380/4 X |
| 4,791,565 | 12/1988 | Dunham et al. | 380/4 X |
| 5,109,413 | 4/1992 | Comerford et al. | 380/4 |

Primary Examiner—Bernarr E. Gregory
Attorney, Agent, or Firm—Michael B. Johannesen

[57] ABSTRACT

A system and method for establishing licensor changeable limits on shared software usage without the licensor having access to the system on which the shared software is running. An encrypted numerical limit value is embedded in the licensed software (program); when the program is executed ("accessed"), as a first step, the program decrypts the limit value and compares it to the number of users currently accessing the shared program. If the number of users is less than the limit, then access is allowed. If the number of users is equal to (or greater than) the limit, then access is denied.

13 Claims, 4 Drawing Sheets

FIG. 3

ACCESS LIMIT UPDATE SCREEN

ENCRYPTED
ACCESS
LIMIT      *asdkfj$#@BT@#$$D1h8465bBV3Xs* ⟵ 300

ACCESS LIMIT
Maximum allowed users      5,000 ⟵ 310

Current users      3,567 ⟵ 320

FIG. 4

SUBSCRIBER PROFILE SCREEN

Subscriber Telephone Number: 708 555 6538

FEATURES:
- 400 — Call Forwarding (y/n)     y
- 410 — Call Waiting (y/n)        n
- 420 — Three Way Calling (y/n)   n
- Calling Line Ident.             n

METHOD FOR ESTABLISHING LICENSOR CHANGEABLE LIMITS ON SOFTWARE USAGE

TECHNICAL FIELD

This invention relates to the field of data process, and, more specifically, to the field of limiting access to multi-user software wherein the limit may be changed by the licensor.

BACKGROUND OF THE INVENTION

In software licensing agreements, especially for multi-user software, licensors commonly include contractual limits on the number of users who may have access to the software, the number of simultaneous users, and-/or the number of total accesses. This is particularly important in licenses for multi-user software packages used in telephone switching systems where software-controlled features are licensed on a per-line basis. A common problem in the art is that there is no effective method of enforcing and policing such agreements even with audits of software usage and/or site inspections.

SUMMARY OF THE INVENTION

This problem is solved and a technical advance is achieved in the art by a method for establishing licensor changeable limits on shared software usage without the licensor having access to the system on which the shared software is running. An encrypted numerical limit value is embedded in the licensed software (program); when the program is executed ("accessed"), as a first step, the program decrypts the limit value and compares it to the number of users currently accessing the shared program. If the number of users is less than the limit, then access is allowed. If the number of users is equal to (or greater than) the limit, then access is denied. The licensor may supply the licensee with a new encrypted limit value to raise the number of allowed accesses.

Since the licensee does not have access to the encryption algorithm, it cannot change the limit value. If the licensee attempts to enter a random string as the encrypted limit value and the decrypted value is not valid, then access is denied to everyone. Furthermore, the number of accesses to the encrypted value may be limited (i.e., two or three times a week), to prevent the licensee from attempting to determine the encryption algorithm.

In the context of a telephone switching system, features provided to customers are generally controlled by shared software packages ("programs"). In this context, each time a customer is allowed access to a protected feature, the encrypted limit is decrypted and compared with the number of users currently using the feature. If the number of users is less than the limit, then the user is allowed to use the feature. Otherwise, the user is not allowed to use the feature. The encrypted limit, an alphanumeric string, can be changed using standard field update facilities.

BRIEF DESCRIPTION OF THE DRAWING

FIG. 3 is an exemplary maintenance screen as displayed on the maintenance console of FIG. 1 illustrating an update of the encrypted alphanumeric string;

FIG. 4 is an exemplary maintenance screen as displayed on the maintenance console of FIG. 1 illustrating an update of user access to a shared feature.

DETAILED DESCRIPTION

Figure 1:
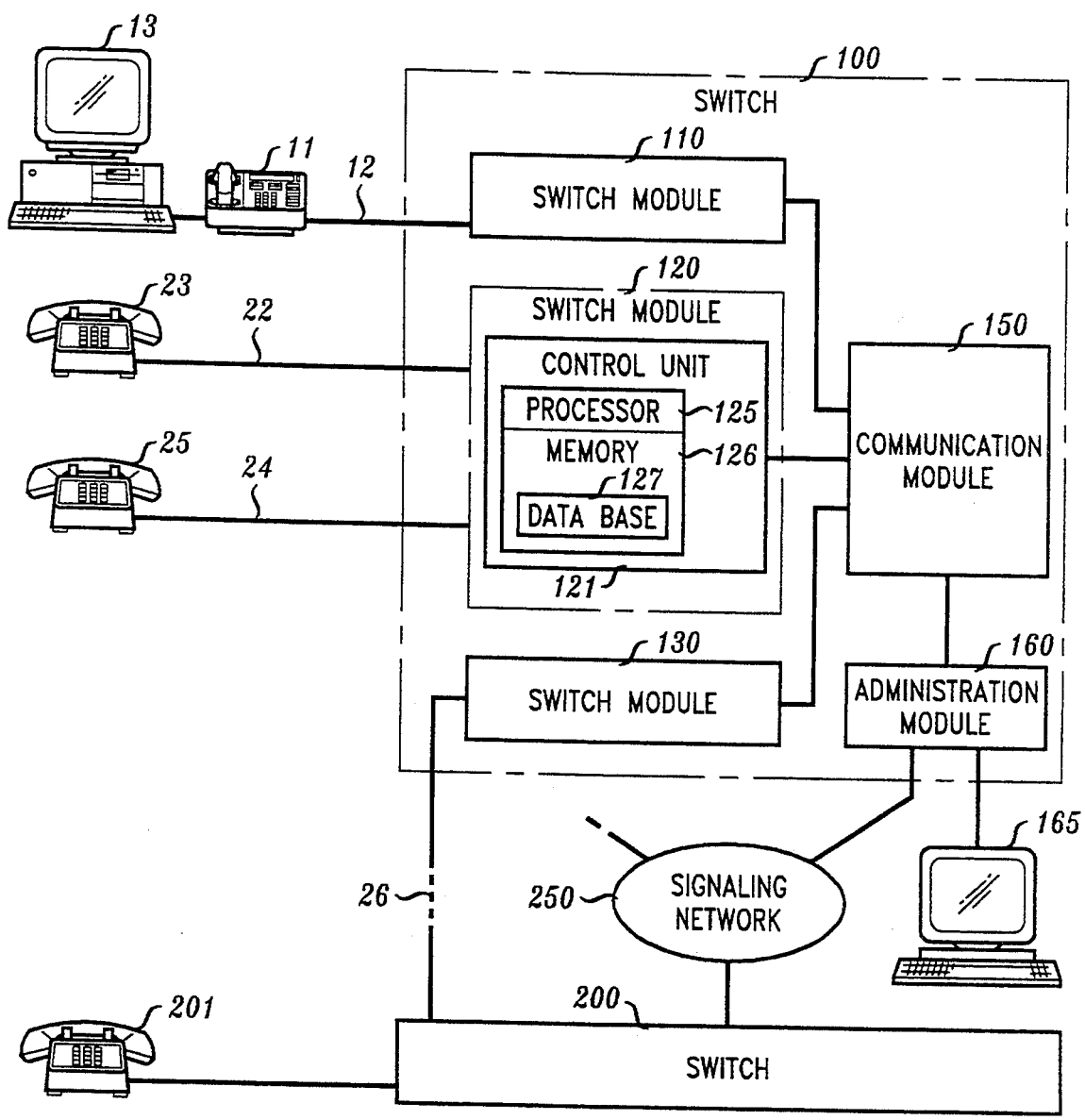
FIG. 1 is a block diagram of a switching network configuration, including an exemplary embodiment of this invention.

This invention will be described in connection with the telephone switching system, as illustrated in FIG. 1, but the application of this system is much broader. For example, a method for establishing license or changeable limits on shared programs according to this invention may be used in a general purpose, program-controlled computer system.

The telephone switching network configuration of FIG. 1 has two central office switches, 100 and 200, and inter-switch signaling network 250, e.g., a common channel signaling (CCS7) network and illustrative communications stations, including conventional analog telephone station sets 23, 25, and 201, an integrated services digital network (ISDN) telephone set I 1, and data terminal 13. Switches 100 and 200 are interconnected by communication path 26, which may include intermediate switches.

Illustratively, switch 100 is a distributed control ISDN electronic switching system such as the system disclosed in U.S. Pat. No. 4,592,048, issued to M. W. Beckner, et al., on May 27, 1986. Alternatively, switch 100 may be a distributed control, analog or digital switch, such as a 5ESS® switch manufactured by AT&T and described in the AT&T Technical Journal, v. 64, No. 6, July/August, 1985, pages 1303–1564.

Switch 100 includes a number of switching modules (SMs 110, 120, 130), each associated with a different set of telephone station sets or trunks. Each switching module includes a control unit for controlling connections to and from its associated telephone station sets or trunks. Switching module 1 10, for example, includes control unit 1 10 for controlling connections to and from telephone station set 11. Switching module 120 includes control unit 121 for controlling connections to and from station set 23. Each control unit comprises a processor 125 and memory 126. Each memory 126 includes a database 127, wherein processor 125 stores configuration and operational data, as is known in the art. For example, lists of features associated with telephone station sets 23 and 25 are stored in database 127. Features such as call forwarding, three-way calling, and the like are controlled by software programs stored in memory 126, and executed by processor 125, using data stored in database 127.

The architecture of switch 100 includes communication module (CM) 150 as a hub with switching modules 110, 120, and 130, and an administrative module (AM) 160 emanating therefrom. AM 160 provides maintenance and provisioning information and commands to SMs 110, 120, and 130, as is known in the art, from maintenance terminal 165.

Switching module 1 10 terminates digital subscriber lines, e.g. 12. Switching module 120 terminates conventional analog lines (i.e., tip ring pairs), 22, 24, and provides circuit-switched connections to and from associated telephone sets 23, and 25. Switching module 130 is similar to switching modules 110 and 120, but includes the appropriate analog or digital trunk unit (not shown)

for interfacing with the outgoing trunks included in communication path 26 to switch 200. To complete the description of switch 100, communication module 150 acts as a switch fabric for communication among switch modules and administrative module (AM) 160. Switch 200 is shown connected to a conventional analog telephone station set 201, for purposes of illustration. The architecture of switch 200 and the types of telephone station sets served by switch are not important to the present invention and are thus not described further.

In the context of switch 100, the method for establishing licensor changeable limits on software usage can be used illustratively to limit the number of telephone subscribers who can subscribe to a particular feature, for example, call forwarding. It is well known in the art that features such as call forwarding are licensed by switch vendors to customers (operating companies) on a per-line basis. For example, call forwarding may be provided on switch 100 for 5,000 lines. It is in the licensor's interest, therefore, to have a mechanism that limits the number of lines (users) that may use call forwarding at any given time. If the operating company has more users that want call forwarding than the limit allows, the operating company may request and pay for additional line allocations, wherein the vendor may supply a new limit.

Figure 2:
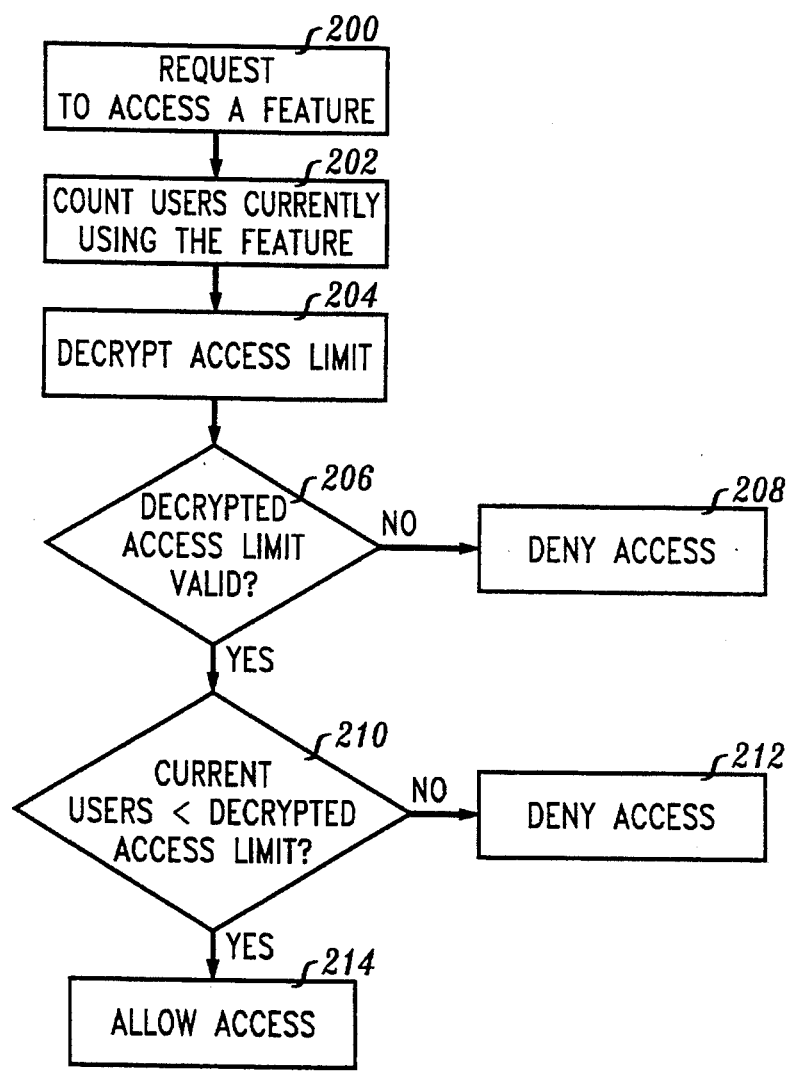
FIG. 2 is a flow chart of the general implementation of an exemplary embodiment of this invention.

Turning now to FIG. 2, a flow chart for a general case of this invention is shown. During the building of the executable program that controls the switching system, a library is linked into the program, as is known in the art, controlling the feature program (in this example the call forwarding feature), which includes a decryption algorithm and a routine to determine whether to allow access to the program. This routine follows the general flow chart shown in FIG. 2. Starting in box 200, a request is received to access a particular feature. In box 202 a count is made of the users currently using the feature. In box 204 the access limit is decrypted using the algorithm loaded when the program was built. The specific encryption algorithm is not important to this invention, as any encryption algorithm may be used without departing from the scope of this invention. It is to the licensor's benefit, of course, to have a difficult encryption algorithm to prevent licensees from reverse engineering the encryption algorithm.

Processing continues to decision diamond 206 where a determination is made whether the decrypted access limit is valid. The decrypted limit is compared to a range of known values. If the limit is out of range or does not decrypt into a numerical value, then it is presumed that the encrypted access limit has been tampered with. Therefore, if, in decision diamond 206, the decryption access limit is not valid, then access to the feature is denied in box 208.

If, in decision diamond 206, the decrypted access limit is valid, then processing proceeds to decision diamond 210, where a determination is made if the number of users is less than the decrypted access limit. If the number of users is greater than the decrypted access limit, then, in box 212, access to the feature is denied. If the number of current users is less than the decrypted access limit, then in box 214, access is allowed.

Turning now to FIG. 3, a screen as displayed on maintenance terminal 165 (FIG. 1) is shown, illustrating the access limit update screen. As stated above, the encrypted access limit may be changed. This feature is advantageous when, for example, the licensee desires to have more users access a particular feature, for example, call forwarding. The licensee would pay for the increased number of lines to use the feature, and the licensor would provide the licensee with a new encrypted access limit. In FIG. 3, a string representing an encrypted access limit is shown at 300. The string may be changed using the maintenance console keyboard. Field 310 shows the current access limit, which is the maximum allowable users for the particular feature. Field 310 equals the decrypted access limit 300. 320 shows the number of users currently accessing the protected feature. Preferably, the encrypted access limit field 300 may be changed only a few times over a predetermined time period. For example, allowing changes to the encrypted access limit field 300 three times a week, aids in preventing a licensee from attempting to reverse engineer the encryption algorithm by replacing the field randomly until a valid string is found.

Turning now to FIG. 4, a screen showing a feature selection list for a particular subscriber (user) is shown. When the licensee allows a subscriber access to a feature, for example, call forwarding, the licensee updates the subscriber's profile. A typical update screen is shown in the example of FIG. 4. The subscriber is identified by telephone number and then a list of available features is displayed. For example, call forwarding 400 is allowed for this subscriber. Call waiting 410 and three-way calling 420 are not allowed. When call forwarding 400 is allowed, the "NO" is changed to "YES", as illustrated. During such updates, the licensed software checks to determine if the licensee has reached the license limit for allowing access to the shared software (i.e., the call forwarding feature). If the license limit has been reached, the software will not allow the update. In this example, the "YES" will automatically turn to "NO".

This embodiment is further useful when ISDN subscribers may turn features on or off by themselves at any given time. A screen (such as FIG. 4), may be displayed at a remote terminal 13 (FIG. 1), controlling features for telephone 11 (FIG. 1). Up to 5,000 subscribers may use call forwarding at any given time, but the operating company may allow more than that number of subscribers the ability to use call forwarding. In this example, when a subscriber attempts to turn on a feature, the licensed software may permit only 5,000 subscribers to use call forwarding.

This invention may also be used to limit the absolute number of telephone subscribers (users) subscribing to features such as call forwarding. A maintenance screen such as FIG. 4 is displayed each time a telephone subscriber feature is changed. When a change is made (changing a "NO" to "YES" in field 400 to allow this subscriber to use call forwarding, for example), the system checks to determine whether the limit of the number of subscribers that have call forwarding available has been reached. If the subscriber limit has not been reached, then the feature is allowed for this subscriber. If the limit is reached, then the feature is denied.

A further use for this invention is to turn software (program) protected by this invention "OFF" as provided by the licensor, and then "ON" after a license fee is paid. The encrypted alphanumeric suing sets a limit of zero for fuming the program "OFF" and sets a limit of infinity for "ON". This may be useful, for example, when software is provided with a system as an option that may be turned on later. The licensor does not have to supply different or additional software for each customer. The licensor merely supplies the appropriate encrypted string according to what the licensee has paid for.

Figure 5:
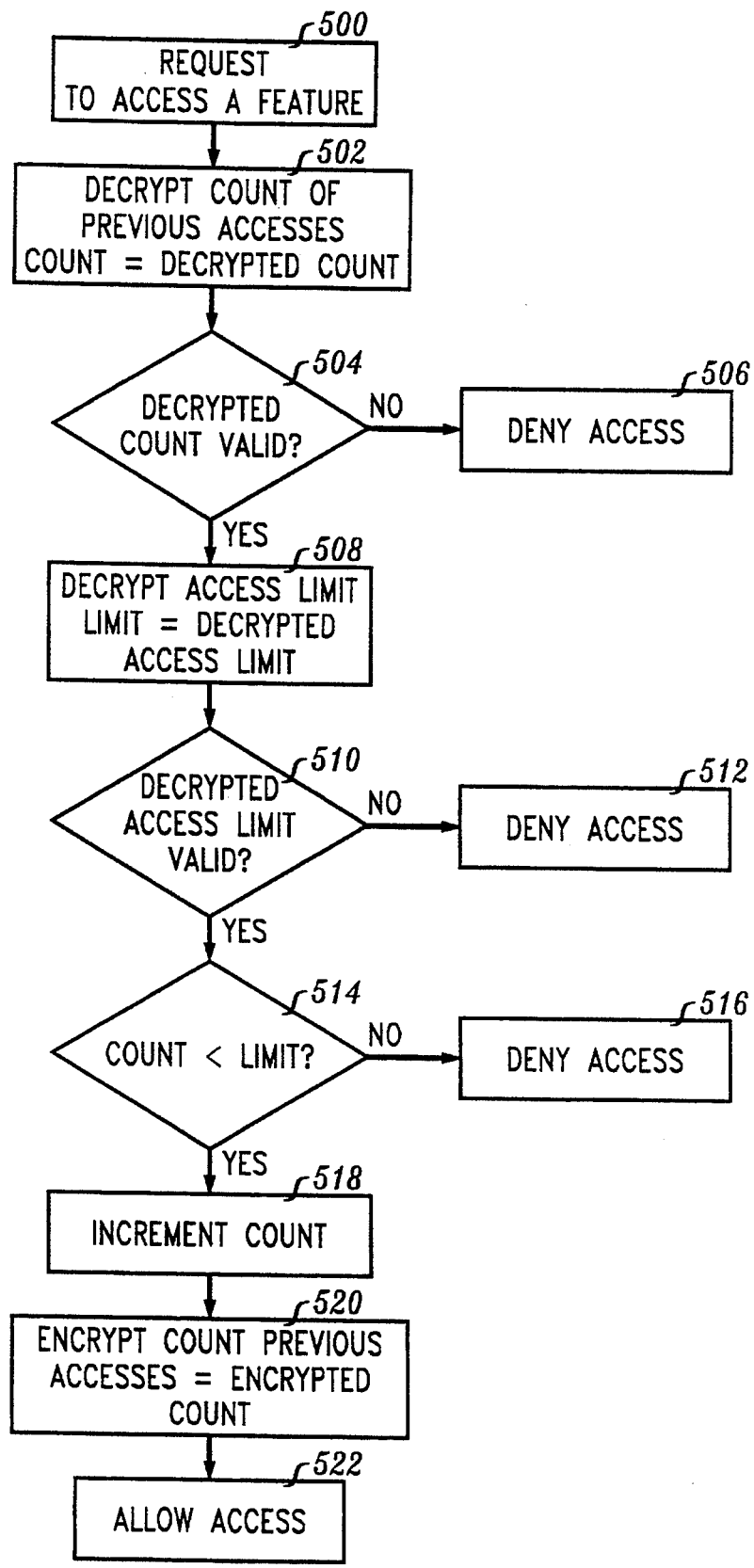
FIG. 5 is a flow chart describing another exemplary embodiment of this invention.

This invention may also be used to control the total number of accesses which may be made to a feature. In other words, this invention may be used to allow a licensee to use a particular feature 5,000 times and no more. This aspect of this invention may be useful, for example, for software operable on a personal computer, or other system where the licensee may desire a limited license to use software. In this embodiment, each time any user attempts to access the license feature, a check is made of the total number of previous accesses, which is compared with the license limit. Both the access limit and the count of the total number of previous accesses are stored in encrypted form to prevent unauthorized change. FIG. 5 illustrates a flow chart according to this embodiment of the invention.

In box 500, a request is made to access the program, and, in box 502, the count of previous accesses is decrypted from an encrypted, stored value. Processing continues to decision diamond 504 where a determination is made if the decrypted count is valid. The decrypted count may not be valid if it is out of a certain range or alternatively does not decrypt into a numeric value. The count may be out of range or non-numeric if the licensee attempts to change the encrypted count of previous accesses. If the decrypted count is not valid, then access is denied in box 506. If in decision diamond 504 the decrypted count is valid, then processing continues to box 508 where the access limit is decrypted. Processing continues to decision diamond 510 where a determination is made if the decrypted access limit is valid. The parameters for validity of the limit are generally the same as for the decrypted count. If the decrypted access limit is not valid, then access is denied in box 512.

If the decrypted access limit is valid in decision diamond 510, then processing continues to decision diamond 514 where the determination is made if the count is less than the limit. If the count is not less than the limit, then access is denied in box 516. If the count is less than the limit, then in decision diamond 514 processing continues to box 518 where the count is incremented. In box 520, the count is then encrypted so that it may be stored in a form that the licensee cannot modify. Processing ends in box 522 where access is allowed to the feature or software.

It is to be understood that the above-described embodiments are merely illustrative principles of the invention, and that many variations may be devised by those skilled in the art, without departing from the scope of the invention, it is, therefore, intended that such variations be included within the scope of the claims.

I claim:

1. In a computer system, said computer system executing a plurality of licensed programs, wherein one or more of said plurality of licensed programs is accessible by a plurality of users, a method for providing licensor control of a maximum number of users accessing said one or more licensed programs without requiring a reference to information stored outside of said licensed program, said method comprising the steps of:

receiving a request from a user for access to said program;

establishing a limit value defining said maximum number by decrypting a portion of a previously encrypted alphanumeric string provided in said program by said licensor;

determining a count of users currently accessing said program;

comparing said limit value to said count of users currently accessing said program;

denying access to said program is said count is greater than said limit value; and allowing access to said program if said count is less than said limit value;

wherein said limit value is changeable by said licensor informing a licensee of a further alphanumeric string containing a new limit value, and said licensee replacing said alphanumeric string with said further alphanumeric string using a program change facility of said computer system, so that change of limit value is controllable by said licensor without said licensor having physical access to said system.

2. A method according to claim 1 wherein a number of changes by said licensee of said encrypted alphanumeric string over a predetermined period of time is limited to prevent said licensee from determining an encryption algorithm used to generate said encrypted alphanumeric string.

3. A method according to claim 1 further comprising the step of verifying that said limit value is a valid numeric value after said step of decrypting said encrypted alphanumeric string; and denying access to said licensed program is said limit value is not a valid numeric value, so that a licensee cannot replace said encrypted alphanumeric string with random values in order to circumvent said encrypted alphanumeric string.

4. In a computer system, said computer system executing a licensed program, wherein said licensed program is accessible a limited number of times, said limited number being set by a licensor, a method of limiting the number of accesses to said licensed program without requiring reference to information stored outside of said licensed program comprising the steps of:

requesting access to said program;

establishing a number of accesses by decrypting a previously encrypted first alphanumeric string stored in said program;

establishing a limit defining said limited number by decrypting a previously encrypted second alphanumeric string stored in said program;

comparing said limit to said number of accesses;

if said number of accesses is equal to or greater than said limit, denying access to said licensed program; and if said number of accesses is less than said limit, allowing access to said licensed program incrementing said number of accesses, encrypting said number of accesses into said first alphanumeric string, and storing said first alphanumeric string in said program.

5. A method according to claim 4, wherein said second encrypted alphanumeric string is changeable by a licensee replacing said second encrypted alphanumeric string with a further encrypted alphanumeric string provided by said licensor, whereby a licensor changes the limit value of the number of accesses without having physical access to said computer system.

6. A method according to claim 5, wherein a number of changes by said licensee of said second encrypted alphanumeric string over a predetermined period of time is limited to prevent said licensee from determining an encryption algorithm used to generate said alphanumeric string.

7. A method according to claim 4 further comprising the steps of verifying that said number of accesses is a valid numeric value after said step of decrypting said first encrypted alphanumeric string;
verifying that said limit is a valid numeric value after said step of decrypting said second encrypted alphanumeric string; and
denying access to said licensed program if said number of accesses or said limit is not a valid numeric value, to prevent said licensee from replacing said first or second encrypted alphanumeric string with random values in order to circumvent said first and second alphanumeric strings.

8. In a telephone switching system, said system providing a plurality of features, wherein one or more of said features is accessible by a plurality of users, a method for a licensor to limit a maximum number of simultaneous users accessing said one or more features without requiring reference to information stored outside of said licensed program, said method comprising the steps of:
receiving a request from a user for access to one of said features;
establishing a limit value defining said maximum number of simultaneous users by decrypting a portion of a previously encrypted alphanumeric string provided by said licensor in said one feature;
comparing said limit to a determined count of users currently accessing said one feature;
denying access to said one feature if said count is greater than said limit; and
allowing access to said one feature if said count is less than said limit;
wherein said limit value is changeable by said licensor informing a licensee of a further alphanumeric string containing a new limit value, and said licensee replacing said alphanumeric string with said further alphanumeric string using a program change facility of said computer system, so that change of said limit value is controllable by said licensor without said licensor having physical access to said system.

9. A method according to claim 8 wherein a number of changes by said licensee of said encrypted alphanumeric string over a predetermined period of time is limited to prevent said a licensee from circumventing an encryption algorithm used to generate said encrypted alphanumeric string.

10. A method according to claim 8 further comprising the step of verifying that said limit is a valid numeric value after said step of decrypting said encrypted alphanumeric string; and
denying access to said feature if said limit is not a valid numeric value, to prevent a licensee from replacing said encrypted alphanumeric string with random values in order to circumvent said alphanumeric string.

11. In a telephone switching system, said system having a plurality of features, wherein one of more of said features is accessible by a plurality of users, a system for providing licensor control of a maximum number of users accessing one or more features without requiring reference to information stored outside of said features, said control system comprising:
means responsive to a request for access to one of said features for decrypting a portion of a previously encrypted alphanumeric string provided by said licensor in said one feature to establish a limit value defining said maximum number of users;
means for determining a count of users;
means responsive to said decrypted limit value for comparing said limit value to said count of users currently using said feature, wherein said comparing means denies access to said feature if said count is greater than said limit, and allows access to said feature if said count is less than said limit; and
means for changing said encrypted alphanumeric string that replaces said encrypted alphanumeric string in said one feature with a further encrypted alphanumeric string containing a new limit value after said licensor informs said licensee of said further encrypted string so that said limit value is changeable by said licensor without said licensor having physical access to said system.

12. A system according to claim 11 further including means for limiting a number of changes by a licensee of said encrypted alphanumeric string over a predetermined period of time to prevent said licensee from circumventing an encryption algorithm used to generate said encrypted alphanumeric string.

13. A system according to claim 11 further comprising means for verifying that said limit is a valid numeric value responsive to said decrypting means, said verifying means denying access to said feature if said limit is not a valid numeric value, to prevent said licensee from replacing said encrypted alphanumeric string with random values in order to circumvent said encrypted alphanumeric string.

* * * * *

UNITED STATES PATENT AND TRADEMARK OFFICE
CERTIFICATE OF CORRECTION

PATENT NO. : 5,343,526
DATED : August 30, 1994
INVENTOR(S) : H. A. Lassers

It is certified that error appears in the above-indentified patent and that said Letters Patent is hereby corrected as shown below:

Column 5, line, 62, claim 1, "requiring a" should be "requiring".

Column 6, line 30, claim 3, "program is said" should be " program if said".

Column 8, line 14, claim 11, "accessing one" should be "accessing said one".

Signed and Sealed this

Eighth Day of November, 1994

Attest:

BRUCE LEHMAN

Attesting Officer     Commissioner of Patents and Trademarks